United States Patent
Eto et al.

(10) Patent No.: US 9,183,684 B2
(45) Date of Patent: Nov. 10, 2015

(54) REMOTE CONTROL DEVICE FOR AN ACTIVATION DEVICE MOUNTED IN A VEHICLE

(71) Applicants: KABUSHIKI KAISHA HONDA LOCK, Miyazaki-shi, Miyazaki (JP); OMRON AUTOMOTIVE ELECTRONICS CO., LTD., Komaki-shi, Aichi (JP)

(72) Inventors: Shinichiro Eto, Miyazaki (JP); Yoshihito Kunimoto, Miyazaki (JP); Nobuyuki Arai, Miyazaki (JP); Yosuke Kajima, Iida (JP); Kazunobu Kamisawa, Iida (JP); Takanori Okaniwa, Iida (JP)

(73) Assignees: Kabushiki Kaisha Honda Lock, Miyazaki (JP); Omron Automotive Electronics Co., Ltd., Aichi (JP)

( * ) Notice: Subject to any disclaimer, the term of this patent is extended or adjusted under 35 U.S.C. 154(b) by 147 days.

(21) Appl. No.: 14/093,645

(22) Filed: Dec. 2, 2013

(65) Prior Publication Data

US 2014/0159865 A1    Jun. 12, 2014

(30) Foreign Application Priority Data

Dec. 7, 2012 (JP) .................................. 2012-268054

(51) Int. Cl.
*G07C 9/00*      (2006.01)
*B60R 25/24*     (2013.01)
*H04L 1/00*      (2006.01)

(52) U.S. Cl.
CPC .......... *G07C 9/00126* (2013.01); *B60R 25/246* (2013.01); *H04L 1/0053* (2013.01)

(58) Field of Classification Search
None
See application file for complete search history.

(56) References Cited

U.S. PATENT DOCUMENTS 4,942,393 A      7/1990   Waraksa et al.
5,299,228 A *    3/1994   Hall .............................. 370/335

(Continued)

FOREIGN PATENT DOCUMENTS

FR    2 959 048 A1    10/2011
GB    2 432 026 A      5/2007

(Continued)

OTHER PUBLICATIONS

Official Communication dated Feb. 18, 2015 issued in the corresponding Japanese Patent Application 2012-268054.

(Continued)

*Primary Examiner* — Brian Miller
(74) *Attorney, Agent, or Firm* — Carrier Blackman & Associates, P.C.; Joseph P. Carrier; William D. Blackman

(57) ABSTRACT

In a remote control device for a vehicle including: a portable transmitter configured to repeatedly transmit a signal for giving an instruction to activate an activation device mounted in a vehicle, in response to an operation of a manipulator which is performed continuously for a predetermined time or more; and a vehicle-side receiver provided in the vehicle to activate the activation device based on the signal transmitted from the portable transmitter, the portable transmitter transmits a first signal including a data frame having at least an ID code, a function code determining an action of the activation device, and a first error detection code and then repeatedly transmits a second signal, and a data frame of the second signal having the same function code as that of the first signal and a second error detection code generated based on the function code and the data frame of the first signal.

4 Claims, 5 Drawing Sheets

(56) References Cited

U.S. PATENT DOCUMENTS

| | | | |
|---|---|---|---|
| 5,633,742 A * | 5/1997 | Shipley | 398/118 |
| 5,838,257 A * | 11/1998 | Lambropoulos | 340/5.61 |
| 5,844,517 A * | 12/1998 | Lambropoulos | 341/176 |
| 6,169,492 B1 * | 1/2001 | Dabbish | 340/5.2 |
| 6,198,995 B1 * | 3/2001 | Settles et al. | 701/29.1 |
| 6,567,012 B1 | 5/2003 | Matsubara et al. | |
| 6,580,353 B1 | 6/2003 | Geber et al. | |
| 6,597,897 B2 * | 7/2003 | Tang | 455/95 |
| 6,724,322 B2 * | 4/2004 | Tang et al. | 340/989 |
| 6,816,081 B1 | 11/2004 | Okada et al. | |
| 7,050,775 B2 * | 5/2006 | Mayor et al. | 455/258 |
| 7,129,816 B2 * | 10/2006 | Tsuji et al. | 340/5.26 |
| 7,167,780 B2 | 1/2007 | Hattori | |
| 7,209,030 B2 * | 4/2007 | Nolan et al. | 340/426.36 |
| 7,346,006 B2 | 3/2008 | Inoue et al. | |
| 7,688,244 B2 * | 3/2010 | Lee et al. | 341/176 |
| 7,916,040 B2 * | 3/2011 | Andersen et al. | 340/12.22 |
| 2003/0117294 A1 * | 6/2003 | Hatano et al. | 340/825.72 |
| 2003/0129949 A1 | 7/2003 | Selektor | |
| 2006/0208069 A1 | 9/2006 | Gilbert et al. | |
| 2008/0197986 A1 * | 8/2008 | Chen | 340/426.15 |

FOREIGN PATENT DOCUMENTS

| | | |
|---|---|---|
| JP | H05316574 A | 11/1993 |
| JP | H08-199882 A | 8/1996 |
| JP | H10131569 A | 5/1998 |
| JP | H11141211 A | 5/1999 |
| JP | 2000145223 A | 5/2000 |
| JP | 2000297568 A | 10/2000 |
| JP | 2002037024 A | 2/2002 |
| JP | 2003-110554 A | 4/2003 |
| JP | 2004-239002 A1 | 8/2004 |

OTHER PUBLICATIONS

European Search report dated Sep. 24, 2014 issued in corresponding EP Patent Application 13 19 6100.

* cited by examiner

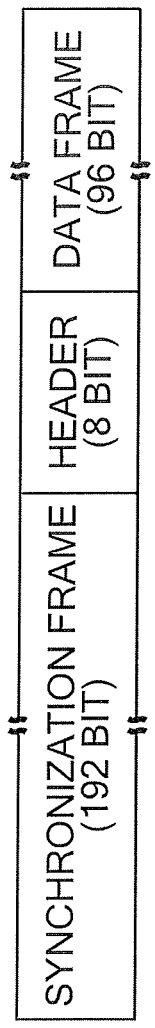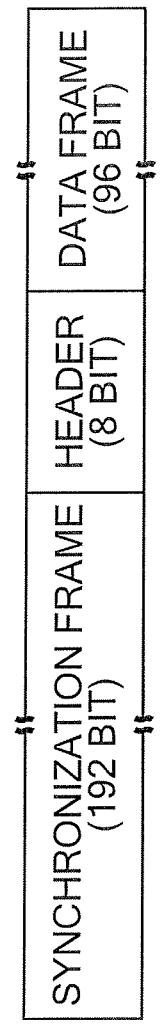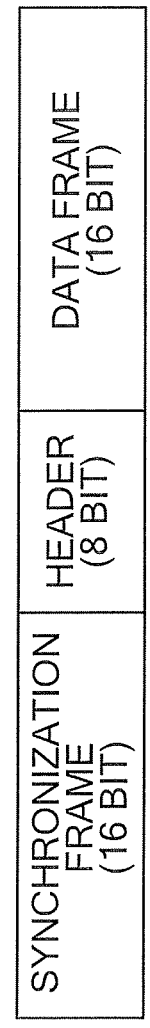
FIG.4A UNLOCK SIGNAL
FIG.4B FIRST SIGNAL
FIG.4C SECOND SIGNAL

FIG.5A
DATA FRAME OF UNLOCK SIGNAL

| ROLLING CODE (16 BIT) | ID CODE (32 BIT) | FUNCTION CODE (8 BIT) | ENCRYPTION CODE (32 BIT) | ERROR DETECTION CODE (8 BIT) |
|---|---|---|---|---|

FIG.5B
DATA FRAME OF FIRST SIGNAL

| ROLLING CODE (16 BIT) | ID CODE (32 BIT) | FUNCTION CODE (8 BIT) | ENCRYPTION CODE (32 BIT) | ERROR DETECTION CODE (8 BIT) |
|---|---|---|---|---|

FIG.5C
DATA FRAME OF SECOND SIGNAL

| FUNCTION CODE (8 BIT) | ERROR DETECTION CODE (8 BIT) |
|---|---|

REMOTE CONTROL DEVICE FOR AN ACTIVATION DEVICE MOUNTED IN A VEHICLE

BACKGROUND OF THE INVENTION

1. Field of the Invention

The present invention relates to a remote control device for a vehicle comprising: a portable transmitter configured to repeatedly transmit a signal for giving an instruction to activate an activation device mounted in a vehicle, in response to an operation of a manipulator which is performed continuously for a predetermined time or more; and a vehicle-side receiver provided in the vehicle to activate the activation device on the basis of the signal transmitted from the portable transmitter.

2. Description of the Related Art

Japanese Patent Application Laid-open No. 2004-239002 has made known a system in which an activation device provided in a vehicle, such as a power window, is activated by pressing and holding an operation button of a portable transmitter owned by vehicle user. In such a system, when the operation button is pressed and held, the portable transmitter transmits a signal of a first frame type including a synchronization frame, a header, and a data frame, and then repeatedly transmits a signal of a second frame type in which the synchronization frame is shorter than that of the first frame type but the data frame is the same as that of the first frame type.

Since a signal having a long data length is repeatedly transmitted from the portable transmitter in the pressing and holding of the operation button, a battery of the portable transmitter is consumed rapidly and the battery life is reduced.

Meanwhile, the following system is known from Japanese Patent Application Laid-open No. 2003-110554. When encrypted data is repeatedly transmitted from a portable transmitter and a signal of the same data is received, a stored code is called and used without decoding the received signal thereby enabling reduction of a processing load of a CPU or the like for decoding. However, this operation is performed in a receiver provided in a vehicle and does not reduce battery power consumption of the portable transmitter.

SUMMARY OF THE INVENTION

The present invention has been made in view of the circumstances described above, and an object thereof is to provide a remote control device for a vehicle which can reduce battery consumption of a portable transmitter.

In order to achieve the object, according to a first aspect of the present invention, there is provided a remote control device for a vehicle comprising: a portable transmitter configured to repeatedly transmit a signal for giving an instruction to activate an activation device mounted in a vehicle, in response to an operation of a manipulator which is performed continuously for a predetermined time or more; and a vehicle-side receiver provided in the vehicle to activate the activation device on the basis of the signal transmitted from the portable transmitter, wherein in response to the continuous operation of the manipulator which is performed to give the instruction to activate the activation device, the portable transmitter transmits a first signal including a data frame having at least an ID code, a function code determining an action of the activation device, and a first error detection code and then repeatedly transmits a second signal, and a data frame of the second signal is set to have only the same function code as the function code of the first signal and a second error detection code generated based on said function code, and the data frame of the first signal.

According to a second aspect of the present invention, in addition to the first aspect, the data frame of the first signal has a rolling code, the ID code, the function code, an encryption code, and the first error detection code generated from the rolling code, the ID code, the function code, and the encryption code, and the portable transmitter generates the second error detection code included in the data frame of the second signal, from the function code and the codes in the data frame of the first signal other than the function code and the first error detection code.

In the aforementioned aspects of the present invention, when the manipulator is operated continuously to give an instruction to activate the activation device, the portable transmitter transmits the first signal including the data frame having at least the ID code, the function code, and the first error detection code and then repeatedly transmits the second signal, and the data frame of the second signal has only the function code and the second error detection code generated based on the function code and the data frame of the first signal. Accordingly, data length of the second signal can be reduced. This can reduce current consumption of the portable transmitter in a case where the manipulator is operated continuously, and thereby suppress reduction of battery life.

According to a third aspect of the present invention, in addition to the first or second aspect, the portable transmitter is capable of transmitting a signal for giving an instruction to unlock or lock a door, in response to an operation of the manipulator which is performed for a short time less than the predetermined time.

Particularly in the third aspect, the manipulator can have a function of giving the instruction to lock or unlock the door, in addition to a function to give the instruction to activate the activation device. Various kinds of remote operations can be thus performed by using the portable transmitter with the number of required manipulators being suppressed to a small number.

The above and other objects, characteristics and advantages of the present invention will be clear from detailed descriptions of the preferred embodiment which will be provided below while referring to the attached drawings.

BRIEF DESCRIPTION OF THE DRAWINGS

FIGS. 4A to 4C are views for comparing formats of an unlock signal, a first signal, and a second signal.

FIGS. 5A to 5C are views in which data frame configurations of the unlock signal, the first signal, and the second signal are compared.

DESCRIPTION OF THE PREFERRED EMBODIMENT

Figure 1:
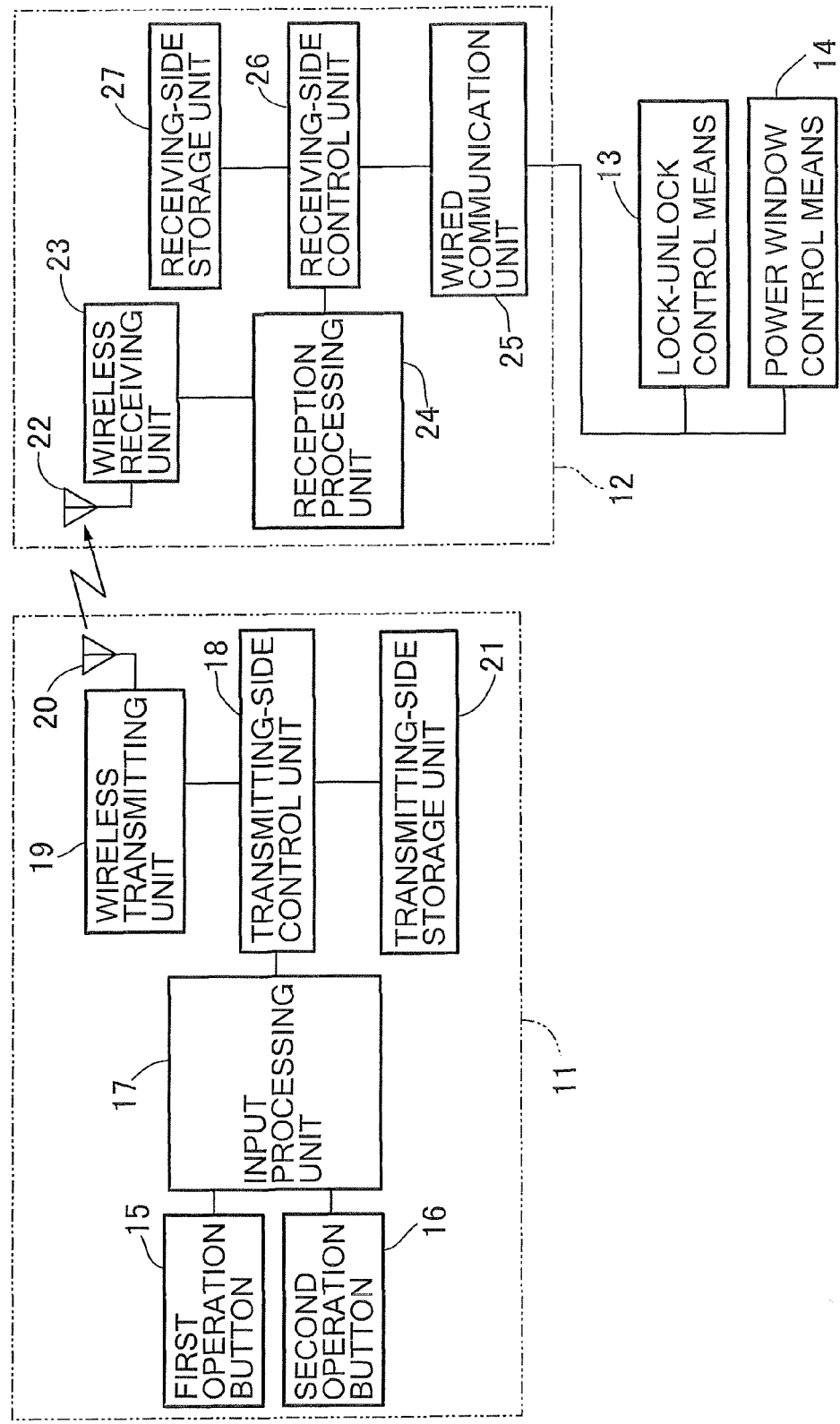
FIG. 1 is a view showing an overall configuration of a remote control device.

An embodiment of the present invention is described below with reference to attached FIGS. 1 to 5C. First, in FIG. 1, a portable transmitter 11 carried by a vehicle user can wirelessly transmit a signal for giving an instruction to lock or unlock a door of a vehicle and a signal for giving an instruction to activate an activation device mounted in the vehicle such as a power window mechanism. A vehicle-side receiver 12 provided on the vehicle side sends lock-unlock control means 13 and power window control means 14 command signals based on the signals transmitted from the portable transmitter 11. Based on the commands sent from the vehicle-side receiver 12, the lock-unlock control means 13 controls locking or unlocking of the door and the power window control means 14 controls an opening action or closing action of a window.

The portable transmitter 11 includes: a first operation button 15 which is a manipulator for giving commands to unlock the door and open the window; a second operation button 16 which is a manipulator for giving commands to lock the door and close the window; an input processing unit 17 which processes input signals from the first and second operation buttons 15, 16; a transmitting-side control unit 18 which generates operation information to be transmitted to the vehicle-side receiver 12, on the basis of signals inputted from the input processing unit 17; a wireless transmitting unit 19 which wirelessly transmits signals based on the operation information from the transmitting-side control unit 18, to the vehicle-side receiver 12 via a transmitting antenna 20; and a transmitting-side storage unit 21 which stores operating programs used in the transmitting-side control unit 18, the operation information transmitted in the past, or the like.

Moreover, the vehicle-side receiver 12 includes: a wireless receiving unit 23 which receives signals transmitted from the transmitting antenna 20 via a receiving antenna 22; a reception processing unit 24 which recovers the operation information from the signals received by the wireless receiving unit 23; a wired communication unit 25 which performs data communication between the lock-unlock control means 13 and the power window control means 14 through wires; a receiving-side control unit 26 which converts the operation information recovered by the reception processing unit 24 to data transmittable from the wired communication unit 25; and a receiving-side storage unit 27 which stores operating programs used in the receiving-side control unit 26, or the like.

Figure 2:
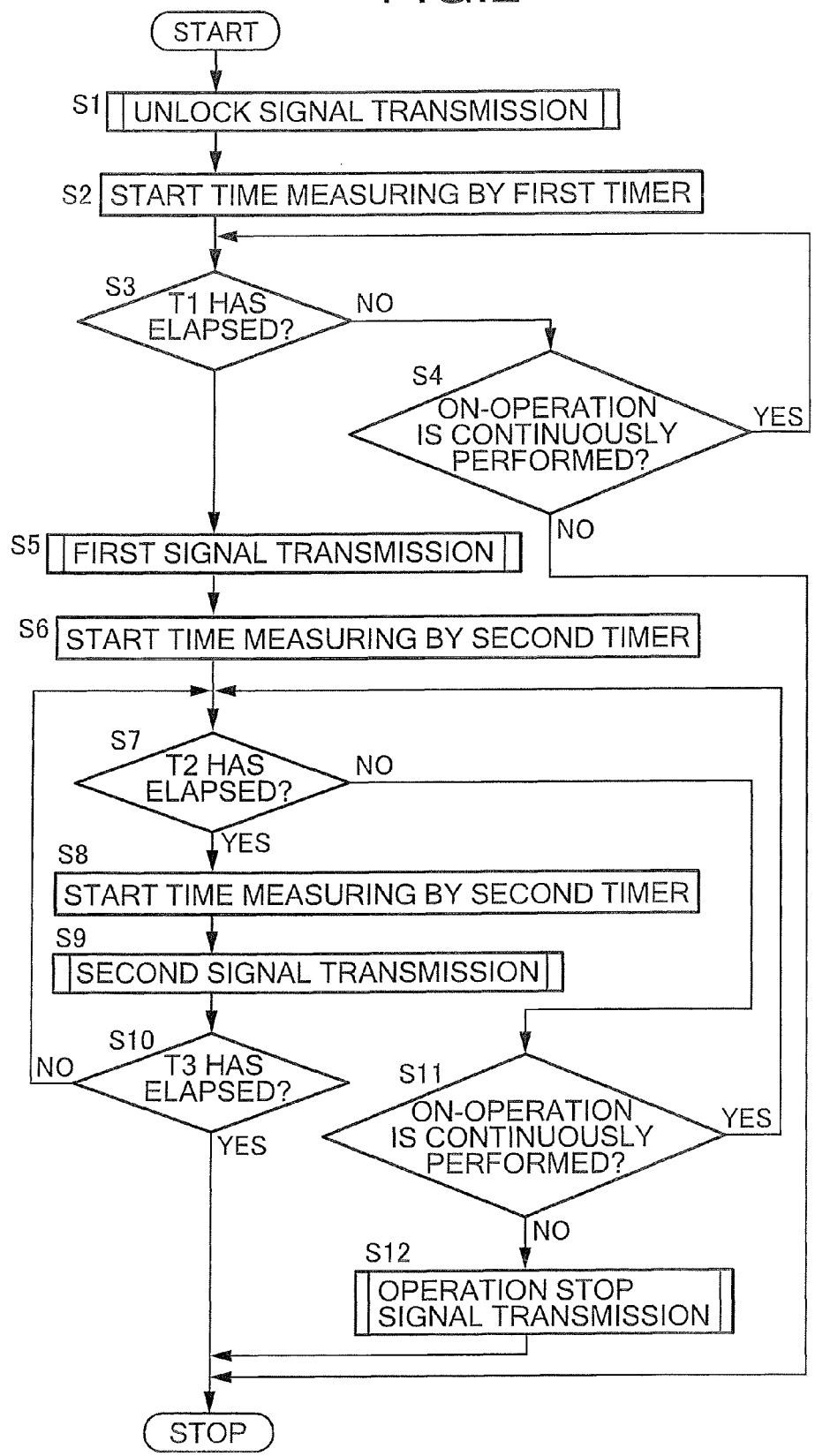
FIG. 2 is a flowchart showing a signal transmission control procedure in a portable transmitter.
Figure 3:
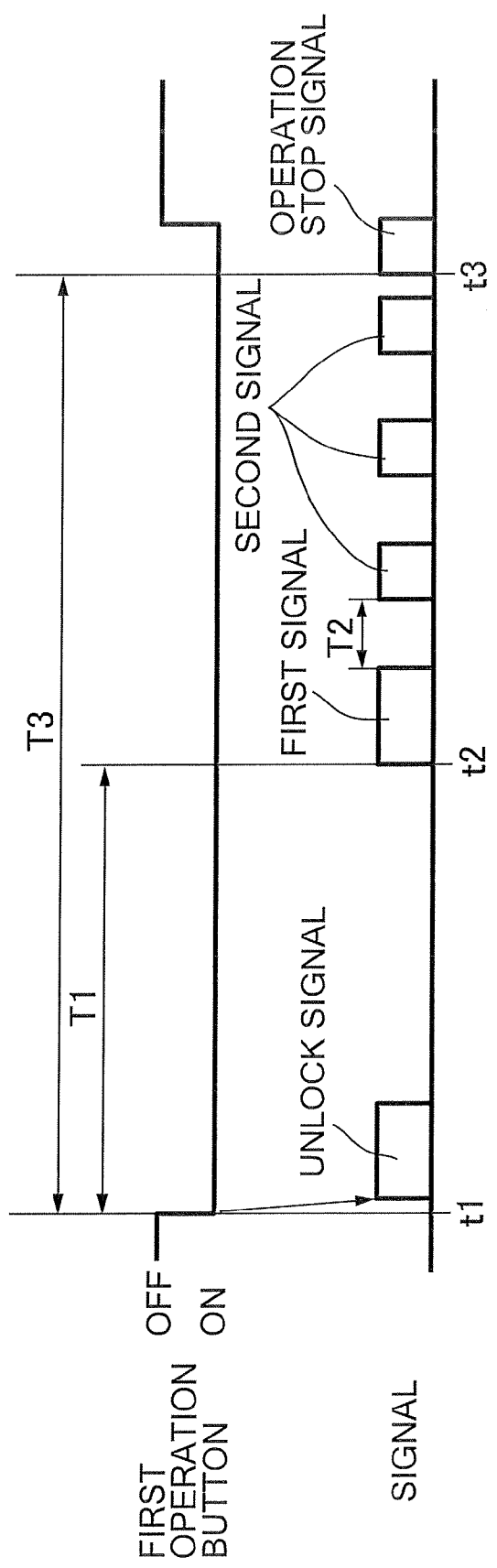
FIG. 3 is a timing chart showing a signal transmission state from the portable transmitter in a case where an operation button is operated.

The portable transmitter 11 transmits the signal to the vehicle-side receiver 12 according to a control procedure shown in FIG. 2, for example, in response to an on-operation in which the vehicle user presses the first operation button 15 used to give the commands to unlock the door and open the window. In step S1, an unlock signal is transmitted in response to the on-operation of the first operation button 15 and, in step S2, time measuring by a first timer is started. In subsequent step S3, when the portable transmitter 11 confirms that a first predetermined time T1, for example, one second, has not elapsed from the start of the time measuring by the first timer, the procedure proceeds to step S4 and the portable transmitter 11 confirms whether or not the on-operation of the first operation button 15 is still continuously performed. When the portable transmitter 11 confirms that the on-operation of the first operation button 15 is still continuously performed, the procedure returns from step S4 to step S3. When the portable transmitter 11 confirms that the on-operation of the first operation button 15 is stopped, the signal transmission to the vehicle-side receiver 12 is stopped.

When the portable transmitter 11 confirms that the first predetermined time T1 has elapsed from the start of the time measuring by the first timer in step S3, the procedure proceeds from step S3 to step S5. In step S5, a first signal for causing the window to move to an opening side is transmitted, and in step S6 after the transmission of the first signal, time measuring by a second timer is started. In subsequent step S7, the portable transmitter 11 confirms whether or not the time measured by the second timer has reached a second predetermined time T2, for example, 200 milliseconds. When the portable transmitter 11 confirms that the measured time has reached the second predetermined time T2, the time measuring by the second timer is started again in step S8 and a second signal for causing the window to move to the opening side is transmitted in step S9. After the transmission of the second signal, in step S10, the portable transmitter 11 confirms whether or not the time measured by the first timer has reached a third predetermined time T3, for example, 10 seconds. When the portable transmitter 11 confirms that the measured time has reached the third predetermined time T3, the signal transmission to the vehicle-side receiver 12 is stopped. When the portable transmitter 11 confirms that the measured time has not reached the third predetermined time T3, the procedure returns from step S10 to step S7.

Meanwhile, when the portable transmitter 11 confirms that the time measured by the second timer has not reached the second predetermined time T2 in step S7, the procedure proceeds from step S7 to step S11. In step S11, the portable transmitter 11 confirms whether or not the on-operation of the first operation button 15 is still continuously performed. When the portable transmitter 11 confirms that the on-operation of the first operation button 15 is still continuously performed, the procedure returns from step S11 to step S7. When the portable transmitter 11 confirms that the on-operation of the first operation button 15 is stopped, the procedure proceeds from step S11 to step S12. In step S12, an operation stop signal for stopping the opening action of the window is transmitted and then the signal transmission to the vehicle-side receiver 12 is stopped.

In the control procedure described above, as shown in FIG. 3, when the on-operation of the first operation button 15 is performed at a timing t1, the portable transmitter 11 first transmits the unlock signal. Then, in a case where the on-operation of the first operation button 15 is continuously performed for the third predetermined time T3 or more, the following operations are performed. After the transmission of the unlock signal, the first signal for causing the window to move to the opening side is transmitted at a timing t2 at which the first predetermined time T1 has elapsed. After the transmission of the first signal, the second signal for causing the window to move to the opening side is transmitted every time the second predetermined time T2 elapses, until the third predetermined time T3 elapses from the transmission of the unlock signal. Then, the operation stop signal for stopping the opening action of the window is transmitted at a timing t3 at which the third predetermined time T3 has elapsed from the transmission of the unlock signal.

In FIGS. 4A to 4C, formats of the unlock signal and the first signal each include a 192-bit synchronization frame, an 8-bit header, and a 96-bit data frame. Meanwhile, the second signal includes a synchronization frame, a header, and a data frame like the unlock signal and the first signal. However, the synchronization frame of the second signal can be simplified compared to that of the first signal because synchronization by the first signal has been already completed. Compared to the synchronization frame of the first signal which is 192 bits, the synchronization frame of the second signal can be made shorter to, for example, 16 bits. Furthermore, the headers of the first and second signals are 8 bits like that of the unlock signal.

The data frames of the unlock signal and the first signal each have at least an ID code, a function code, and a first error detection code. In the embodiment, as shown in FIGS. 5A and 5B, the data frames each have a rolling code, the ID code, the function code, an encryption code such as SR or the like, and the first error detection code such as CRC (cyclic redundancy check) or the like.

The rolling code is a variable code in which, every time the signal is transmitted from the portable transmitter 11, a value is incremented or decremented by "1", for example, for every transmission of the signal, on the basis of a conversion rule determined in advance, and is, for example, 16 bits. Moreover, the ID code is a code for confirming whether or not the portable transmitter 11 has the same ID as that registered in the vehicle, and is, for example, 32 bits. The function code of the unlock signal is a code for giving an instruction to unlock the door and the function code of the first signal is a code for giving an instruction to open the window. Both function codes are, for example, 8 bits, respectively. The first error detection code is generated by using the rolling code, the ID code, the function code, and the encryption code, and is, for example, 8 bits. The data frame of each of the unlock signal and the first signal is thus, for example, 96 bits.

Meanwhile, as shown in FIG. 5C, the data frame of the second signal includes only a function code for giving an instruction to open the window and a second error detection code generated based on the function code, and the data frame of the first signal. In the embodiment, the second error detection code is generated from the function code and the codes in the data frame of the first signal other than the function code and the first error detection code. Since the data frame of the first signal has the rolling code, the ID code, the function code, the encryption code, and the first error detection code, the second error detection code in the data frame of the second signal is generated from the rolling code, the ID code, and the encryption code in the data frame of the first signal, as well as the function code. The second error detection code is, for example, 8 bits.

Description is given above of control which is performed when the first operation button 15 is operated to give commands to unlock the door and open the window. Meanwhile, the following control is performed when the second operation button 16 is operated to give commands to lock the door and close the window. As in the above description, when the on-operation of the second operation button 16 is performed, the portable transmitter 11 first transmits a lock signal. When the on-operation of the second operation button 16 is performed continuously for the third predetermined time T3 or more, the portable transmitter 11 transmits a first signal for causing the window to move to a closing side, after the transmission of the lock signal. After the transmission of the first signal, the portable transmitter 11 repeatedly transmits a second signal for causing the window to move to the closing side, and stops the transmission of the second signal when the third predetermined time T3 elapses.

Next, operations of the embodiment are described. When, in order to give the instruction to activate the activation device mounted in the vehicle, the first operation button 15 or the second operation button 16 is operated continuously for the first predetermined time T1 or more, the portable transmitter 11 transmits the first signal including the data frame having at least the ID code, the function code, for example, for giving the instruction to open or close the window, and the first error detection code, and then repeatedly transmits the second signal including the data frame having only the function code and the second error detection code generated based on the data frame of the first signal. Accordingly, data length of the second signal can be reduced. This can reduce current consumption of the portable transmitter 11 in a case where the first operation button 15 or the second operation button 16 is operated continuously, and thereby suppress reduction of battery life.

Moreover, the portable transmitter 11 can transmit the unlock signal for giving the instruction to unlock the door or the lock signal for giving the instruction to lock the door, in response to the operation of the first operation button 15 or the second operation button 16 which is performed for a short time less than the first predetermined time T1. Accordingly, the first operation button 15 or the second operation button 16 can have the function of giving the instruction to lock or unlock the door in addition to the function of giving the instruction to activate the activation device such as the power window mechanism. Various kinds of remote control can be thus performed by using the portable transmitter 11 with the number of required operation buttons being suppressed to a small number.

Although the embodiment of the present invention has been described above, the present invention is not limited to the embodiment and various design changes can be made without departing from the present invention described in the claims.

What is claimed is:

1. A remote control device for a vehicle comprising:
   a portable transmitter configured to repeatedly transmit a signal for giving an instruction to activate an activation device mounted in a vehicle, in response to an operation of a manipulator which is performed continuously for a predetermined time or more; and
   a vehicle-side receiver provided in the vehicle to activate the activation device on the basis of the signal transmitted from the portable transmitter, wherein
   in response to the continuous operation of the manipulator which is performed to give the instruction to activate the activation device, the portable transmitter transmits a first signal including a data frame having at least an ID code, a function code determining an action of the activation device, and a first error detection code and then repeatedly transmits a second signal, and
   a data frame of the second signal is set to have only the same function code as the function code of the first signal and a second error detection code generated based on said function code and the data frame of the first signal.

2. The remote control device for a vehicle according to claim 1, wherein
   the data frame of the first signal has a rolling code, the ID code, the function code, an encryption code, and the first error detection code generated from the rolling code, the ID code, the function code, and the encryption code, and
   the portable transmitter generates the second error detection code, included in the data frame of the second signal, from the function code and the ID code in the data frame of the first signal.

3. The remote control device for a vehicle according to claim 1, wherein the portable transmitter is capable of transmitting a signal for giving an instruction to unlock or lock a door, in response to an operation of the manipulator which is performed for a short time, less than the predetermined time.

4. The remote control device for a vehicle according to claim 2, wherein the portable transmitter is capable of transmitting a signal for giving an instruction to unlock or lock a door, in response to an operation of the manipulator which is performed for a short time, less than the predetermined time.

* * * * *